United States Patent
Poosapalli et al.

(10) Patent No.: US 12,235,788 B2
(45) Date of Patent: Feb. 25, 2025

(54) METHOD AND APPARATUS FOR AN ORIGINAL EQUIPMENT MANUFACTURER DEFINED SCALABLE AND SAFE MEMORY LAYOUT FIRMWARE

(71) Applicant: Dell Products, LP, Round Rock, TX (US)

(72) Inventors: Karunakar Poosapalli, Bangalore (IN); Shekar Babu Suryanarayana, Bangalore (IN)

(73) Assignee: DELL PRODUCTS LP, Round Rock, TX (US)

( * ) Notice: Subject to any disclaimer, the term of this patent is extended or adjusted under 35 U.S.C. 154(b) by 111 days.

(21) Appl. No.: 18/223,626

(22) Filed: Jul. 19, 2023

(65) Prior Publication Data
US 2025/0028671 A1    Jan. 23, 2025

(51) Int. Cl.
*G06F 13/20*    (2006.01)
*G06F 9/4401*    (2018.01)
*G06F 13/42*    (2006.01)

(52) U.S. Cl.
CPC ........ *G06F 13/4282* (2013.01); *G06F 9/4401* (2013.01)

(58) Field of Classification Search
None
See application file for complete search history.

(56) References Cited

U.S. PATENT DOCUMENTS

| | | | |
|---|---|---|---|
| 10,936,407 B2 | 3/2021 | Chao | |
| 2006/0184717 A1* | 8/2006 | Rothman | G06F 3/0679 711/E12.081 |
| 2014/0298000 A1* | 10/2014 | Gillespie | G06F 3/0673 713/2 |
| 2017/0357450 A1* | 12/2017 | Barbou-Des-Places | G06F 9/445 |
| 2019/0012088 A1 | 1/2019 | Chaluvaiah | |
| 2020/0310774 A1 | 10/2020 | Zhu | |
| 2020/0364040 A1 | 11/2020 | Chao | |

(Continued)

FOREIGN PATENT DOCUMENTS

WO    2022/154795 A1    7/2022

*Primary Examiner* — Henry Tsai
*Assistant Examiner* — Dean Phan
(74) *Attorney, Agent, or Firm* — Prol Intellectual Property Law, PLLC; H. Kenneth Prol

(57) ABSTRACT

An information handling system includes a hardware processor, a memory device operatively coupled to a serial peripheral interface (SPI) chip and the hardware processor. The SPI chip interfaces the hardware processor executing plural stages of boot modules during a boot process of the information handling system with allocated, reserved portions of the memory device for each stage of boot module executed in pre-boot, boot, and runtime via a virtual memory interface generated by execution of an original equipment manufacturer (OEM)-defined agnostic memory allocation module. The hardware processor executes the OEM defined agnostic memory allocation firmware to redefine the virtual memory interface for each allocated reserved portion of the memory device at each of the plural stages of the boot modules that are executed from pre-boot, through boot, and to runtime to provide adjustments to allocated, reserved portions of memory for later stages of executed plural stages of the boot modules.

20 Claims, 5 Drawing Sheets

(56) References Cited

U.S. PATENT DOCUMENTS

| | | |
|---|---|---|
| 2020/0364339 A1 | 11/2020 | Chao |
| 2020/0379843 A1 | 12/2020 | Chao |
| 2021/0004336 A1 | 1/2021 | Liu |
| 2021/0149761 A1 | 5/2021 | Chao |
| 2021/0255900 A1 | 8/2021 | Liu |
| 2023/0020358 A1 | 1/2023 | Liu |

* cited by examiner

METHOD AND APPARATUS FOR AN ORIGINAL EQUIPMENT MANUFACTURER DEFINED SCALABLE AND SAFE MEMORY LAYOUT FIRMWARE

FIELD OF THE DISCLOSURE

The present disclosure generally relates to memory allocation during boot processing and after the boot processing at an information handling system. The present disclosure more specifically relates to memory allocation and reassignment of memory used with a serial peripheral interface (SPI) chip as defined by an original equipment manufacturer for an information handling system.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling needs and requirements vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. Still further, information handling systems may include hardware that includes an SPI chip, a central processing unit (CPU), and a memory device such as random-access memory (RAM) that initiates the booting process that loads the drivers and operating system (OS).

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings may indicate similar or identical items.

DETAILED DESCRIPTION OF THE DRAWINGS

Figure 1:
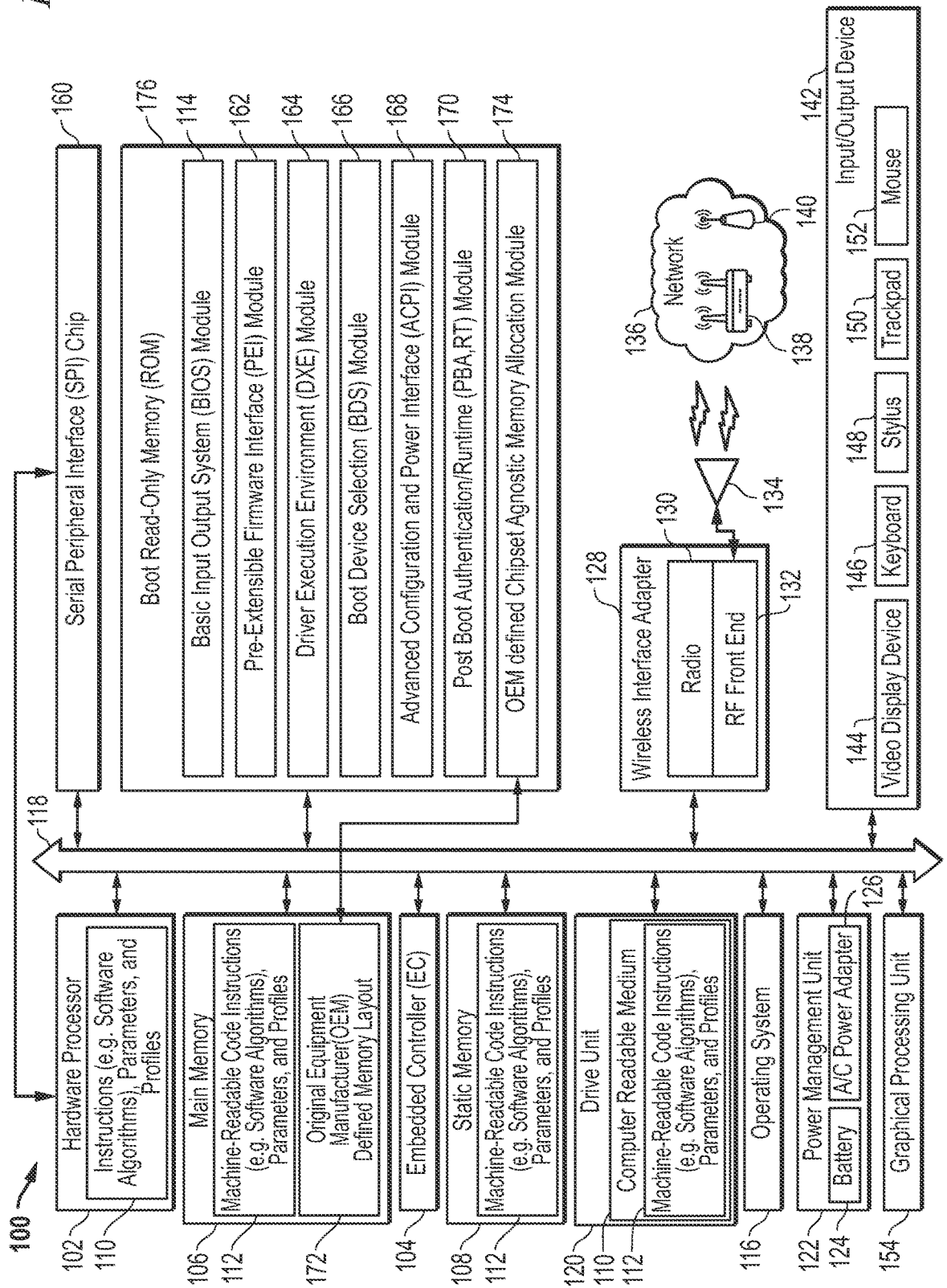
FIG. 1 is a block diagram of an information handling system including an original equipment manufacturer-agnostic (OEM-agnostic) memory allocation firmware executable by a hardware processor used to allocate and repurpose memory usage within the information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Information handling systems operate to provide computing, data storage, and application resources among other computing resources. During a boot process of the information handling system, certain hardware and firmware operate to finally install an operating system (OS) allowing user to interact with the information handling system. This boot process involves several hardware components and modules/firmware/software that initializes this process. For example, as the user pushes an on button at the information handling system, a power on self-test (POST) process is initiated which includes a series of hardware checks to ensure that the hardware devices are functioning correctly. This POST process is completed by the central processing unit (CPU) executing modules, drivers, and/or firmware invoked by the CPU via the serial peripheral interface (SPI) chip, in an embodiment. The SPI chip is a serial interface device with flash memory that includes some processing resources for read/write functions and which uses the Serial Peripheral Interface (SPI) protocol to communicate with CPU or other hardware processing devices among other hardware component devices (e.g., the RAM) within the information handling system.

The SPI chip, SPI protocols, and other hardware links the CPU to executable unified extensible firmware interface (UEFI) modules. System pre-boot and boot modules herein may include various specific firmware, drivers, and/or software that are to be invoked by the central processing unit (CPU) of the information handling system for various stages of pre-boot operations, boot operations, and runtime operations. Modules may exist in firmware stored and executed in part from read only memory (ROM) of various types and executed with additional firmware or software executions during various stages of those pre-boot operations, boot operations, and runtime operations. For example, the UEFI modules include various specific firmware, drivers, and/or software that are to be invoked by the CPU for execution by the central processing unit (CPU) of the information handling system. These UEFI modules may define these various specific sets of firmware for pre-boot and boot actions as well as some runtime functions by allocating each of these pre-boot, boot, and runtime modules as a specific memory location and type. The UEFI firmware-defined memory location and types are defined as dedicated portions of memory, such as random access memory (RAM) memory, on the memory device for pre-boot and boot time service memory allocation and certain runtime memory allocation. Once this memory allocation type has been defined via execution of the UEFI firmware as executed by the CPU, those memory locations cannot be used by other processes during boot time services and during certain runtime services in current systems. For example, part of the UEFI modules include a pre-extensible firmware initialization (PEI) module that, per invoking of the PEI module by the CPU and execution by the CPU, thereby allocating a reserved amount of memory on the memory device (e.g., RAM). Regardless of the size of memory used by the execution of the PEI firmware on the memory device, the amount of memory dedicated to the PEI firmware is not altered in current systems. This may potentially leave memory on the memory device that is unused for the execution and processing of the PEI module or any other pre-boot, boot, or runtime modules used during these pre-boot, boot, and runtime processes. Additionally, there may be some modules executed by the CPU during the PEI stage of the boot process that is no longer needed in subsequent pre-boot, boot, and runtime processes such as the driver execution environment (DXE) stage, the boot device select (BDS) phase, as well as those stages associated with runtime stages and processes such as the loading of hardware drivers, for example. Therefore, during the pre-boot processes, boot process, and runtime processes, the amount of memory dedicated and set for each of these processes cannot be changed or reallocated in current systems. Still further, the memory space devoted to each of these processes is not divisible.

The present specification describes an information handling system that includes a hardware processor, a memory device operatively coupled to a serial peripheral interface (SPI) chip and the hardware processor, and a power management unit (PMU) to provide power to the hardware processor and memory device. In an embodiment, the information handling system the SPI chip interfaces with the hardware processor executing plural stages of boot modules during a boot process of the information handling system to allocate reserved portions of the memory device for each stage of boot module executed in pre-boot, boot, and runtime. In an embodiment, the hardware processor, via the SPI chip, utilizes an original equipment manufacturer (OEM)-defined agnostic memory allocation module to generate a virtual interface for a customized set of allocated reserved portions of the memory device for the plural stages of the boot modules. The present disclosure describes the hardware processor executing the OEM defined agnostic memory allocation firmware to redefine the virtual interface for each allocated reserved portion of the memory device at each of the plural stages of the boot modules that are executed from pre-boot, through boot, and to runtime.

In an embodiment, the hardware processor executes the OEM-defined agnostic memory allocation firmware to reassign part of a first allocated reserved portion of the memory device to a second allocated reserved portion of the memory device after completion of a pre-boot stage the plural stages of boot module execution. Similarly, in an embodiment, the hardware processor executes the OEM-defined agnostic memory allocation firmware to reassign part of a first allocated reserved portion of the memory device to a second allocated reserved portion of the memory device during a runtime stage after boot firmware execution. Here, the hardware processor may access runtime services table in an allocated reserved portion of the memory device created during a driver execution environment stage of the boot process at the SPI chip.

In an embodiment, the hardware processor executing the OEM-defined agnostic memory allocation firmware to create dynamic and customized macros that define a memory map at the SPI chip after the information handling system has been rebooted. Still further, in an embodiment, the execution of the OEM-defined agnostic memory allocation firmware includes delivering signed memory headers that securely redefine the virtual interface for the allocated reserved portions of the memory device for each of the plural stages of the boot module execution through pre-boot, boot, and runtime. In an embodiment, the OEM-signed memory headers generated via the execution of the OEM-defined agnostic memory allocation module support the runtime memory extensions used to allocate reserved memory in the memory device during stages of pre-boot, boot-up, and runtime for improved memory utilization during these stages. In an embodiment, the execution of the OEM-defined agnostic memory allocation module causes as signature for memory allocations and memory redefinitions to be generated. These signatures are used to detect, during any subsequent reallocations of reserved memory in the memory device, those sectors of memory that may, for example, be used by a subsequent pre-boot, boot time, or runtime process stages. This allows, for example, the UEFI drivers, applications, and runtime applications like the basic input/output system (BIOS) updates, recover, and capsule updates, to be part of the memory allocation during rebooting processes.

During the pre-boot and boot stages, the execution of the OEM-defined agnostic memory allocation firmware allows for memory adjustments at the memory device such as the RAM to increase the RAM utilization efficiency and speed. For example, the execution of the OEM-defined agnostic memory allocation module may cause the memory allocation associated with the PEI stage to be reduced, increased, reallocated, or repurposed as the pre-boot and boot stages proceed to the next pre-boot stage such as the DXE phase. The execution of the UEFI firmware causes the CPU to install the PEI services and protocols into the system table updated on the PCI chip to pass control to the DXE stage by calling a DXE function (e.g., DxeIpl( )) which loads the DXE firmware. However, execution of the OEM-defined agnostic memory allocation module by the CPU may cause the updated system table to first define the memory allocated for the use during the PEI phase, define that memory allocated for the PEI stage that is not needed after the PEI stage is completed, and repurpose or reallocate any memory at the RAM not needed for use with subsequent stages such as the DXE phase.

In an embodiment, the hardware processor may execute the OEM-defined agnostic memory allocation module during runtime to discover available persistent memory locations at the memory device, allocate the available persistent memory for use during runtime, and update a memory map associated with the memory device at the SPI chip. Still further, in and embodiment, the hardware processor may execute the OEM-defined agnostic memory allocation module during runtime to update a memory handler during runtime services based on the detected available persistent memory allocated for use during runtime and create a non-volatile random-access memory (NVRAM) variable within a handler database stored on the SPI chip.

During operation and after a power button has been actuated by a user of the information handling system, the SPI chip and CPU are provided power and the CPU begins to initiate a power on self-test (POST) process per execution of the invoked modules to ensure that all hardware components are functioning correctly. At this point the SPI chip may be accessed by the CPU and begin to invoke or utilize the OEM-defined agnostic memory allocation module such that memory in the memory device (e.g., RAM) is allocated for each stage of the pre-boot, boot, and runtime stages. Because the CPU has been activated, the CPU may execute this OEM-defined agnostic memory allocation module via the SPI chip to help define the memory allocation for each of the various stages or stages for pre-boot, booting, and runtime processes described herein. In an example embodiment, the execution of the OEM-defined agnostic memory allocation module allows the CPU to define the customized memory map that creates a persistent memory allocation across cold or warm reboots of the information handling system. In an embodiment, upon execution of the OEM-defined agnostic memory allocation module, that amount of memory on the memory device at locations usually reserved for stages such as the PEI firmware and functions, the DXE firmware and functions, the BDS firmware and functions and drivers, and runtime drivers may be customized to be more or less than otherwise would have been allowed and adjust dependency on stage and determined reach for these stages. For example, where certain amount of memory on the memory device is reserved during the PEI stage of the boot process but is no longer needed when the DXE module is invoked by the SPI chip, that memory reserved for the PEI stage or data associated with the execution of that stage may be identified and the data storage on the memory device may be released, reallocated, and reassigned for use by the memory device and CPU during the next DXE stage or later stages by the execution of the OEM-defined agnostic memory allocation module of the present embodiments. Still further, the CPU may execute the OEM-defined agnostic memory allocation module to update those memory maps and tables used by the SPI chip to direct the CPU to execute correct firmware and software invoked as the boot processes and runtime processes proceed. Accordingly, the amount of data used at the memory device may be reallocated and documented at the SPI chip, in real-time, during these various pre-boot, boot, and runtime processes in order to devote efficient use of memory space to each of these processes, before, during, and after the execution of these pre-boot, boot, and runtime process stages.

In an embodiment, the execution of the OEM-defined agnostic memory allocation module may allow for memory trialing. In an embodiment, pre-boot, boot, and runtime memory trialing may be used to search for given allocated memory within the memory device for those memory locations that do not include successful given address locations. These unaddressed memory locations may be freed for use by other processes during the pre-boot, boot time, and runtime processes. In an embodiment, the unaddressed memory locations may not be erased but simply freed for use during stages of these other pre-boot and runtime processes.

In an embodiment, the OEM-defined agnostic memory allocation module may be agnostic to any information handling system and associated hardware and firmware. In an embodiment, the original equipment manufacturer of the information handling system may predefine the OEM-defined agnostic memory allocation module such that the customization of the memory allocation as described in the memory map maintained at the SPI chip described herein can be accomplished during stages of pre-boot, boot, and runtime. The inclusion of the OEM-defined agnostic memory allocation module execution by the CPU to set allocations at the SPI chip allows for a scalable memory layout that allows the pre-boot, boot, and runtime allocation portions of the memory device to meet dynamic requirements during the pre-boot, boot time, and runtime processes with memory scaling services and dynamic reallocation. This is accomplishable without a system reboot and may be dynamic among stages of the pre-boot, boot-up, or runtime. Still further, OEM-signed memory headers determined via execution of the OEM-defined agnostic memory allocation firmware may be used at the SPI chip by the CPU to support protected memory extensions across modules, pre-boot, boot time, runtime, and across reboots.

FIG. 1 illustrates an information handling system 100 similar to information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 can be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a convertible laptop, a tablet, a smartphone, a communications device, an access point (AP), a base station transceiver, a wireless telephone, a control system, a camera, a scanner, a printer, a personal trusted device, a web appliance, or any other suitable machine capable of executing a set of instructions (sequential or otherwise) that specify actions to be taken by that machine, and can vary in size, shape, performance, price, and functionality. In and embodiment, the information handling system 100 includes an original equipment manufacturer-agnostic (OEM-agnostic) memory allocation module 174 which may be firmware, software, or a combination executable by a hardware processor 102 such as a CPU used to allocate and repurpose memory usage within the information handling system 100 according to an embodiment of the present disclosure.

In a networked deployment, the information handling system 100 may operate in the capacity of a server or as a client computer in a server-client network environment, or as a peer computer system in a peer-to-peer (or distributed) network environment. In a particular embodiment, the computer system 100 can be implemented using electronic devices that provide voice, video, or data communication. For example, an information handling system 100 may be any mobile or other computing device capable of executing a set of instructions (sequential or otherwise) that specify actions to be taken by that machine. In an embodiment, the information handling system 100 may be operatively coupled to a server or other network device. Further, while a single information handling system 100 is illustrated, the term "system" shall also be taken to include any collection of systems or sub-systems that individually or jointly execute a set, or multiple sets, of instructions to perform one or more computer functions.

The information handling system 100 may include memory (volatile (e.g., random-access memory, etc.), non-volatile (read-only memory 176, flash memory etc.) or any combination thereof), one or more hardware processing resources, such as a central processing unit (CPU), a graphics processing unit (GPU) 154, an embedded controller (EC) 104, a hardware processor 102, hardware controllers, or any combination thereof. In an embodiment, the hardware processor 10 may include a central processing unit (CPU) that participates in a booting process to invoke and execute pre-boot and boot firmware, and an operating system (OS) as well as perform runtime processes described herein. Additional components of the information handling system 100 can include one or more storage devices, one or more communications ports for communicating with external devices, as well as various input and output (I/O) devices 142, such as a keyboard 146, a mouse 152, a video display device 144, a stylus 148, a trackpad 150, or any combination thereof. In an embodiment, these I/O devices 142 may be wired or wireless. The information handling system 100 can also include one or more buses 118 operable to transmit data communications between the various hardware components described herein. Portions of an information handling system 100 may themselves be considered information handling systems and some or all of which may be wireless.

Information handling system 100 can include devices or modules that embody one or more of the devices or execute instructions for the one or more systems and modules described above and operates to perform one or more of the methods described herein. The information handling system 100 may execute machine-readable code instructions 112 via the described hardware processing resources that may operate on servers or systems, remote data centers, or on-box in individual client information handling systems according to various embodiments herein. In some embodiments, it is understood any or all portions of machine-readable code instructions 112 may operate on a plurality of information handling systems 100.

As described herein, the information handling system 100 may include hardware processing resources such as a hardware processor 102, a central processing unit (CPU), accelerated processing unit (APU), an EC 104, a neural processing unit (NPU), a vision processing unit (VPU), a digital signal processor (DSP), a GPU 154, a microcontroller, or any other type of hardware processing device that executes code instructions to perform the processes described herein. Any of the hardware processing resources may operate to execute code that is either firmware or software code. Moreover, the information handling system 100 can include memory devices such as main memory 106, static memory 108, computer readable medium 110 storing machine-readable code instructions 112 (e.g., embodied as firmware in some embodiments) of, in an example embodiment, OEM-defined chipset agnostic memory allocation module 174 or other computer executable program code and firmware, and drive unit 120 (volatile (e.g., random-access memory, etc.), nonvolatile (read-only memory 176, flash memory etc.) or any combination thereof). These memory devices may be accessed by any of the hardware processors (e.g., the CPU) described herein to access computer-readable program code of the OEM-defined chipset agnostic memory allocation module 174 as well as memory maps created as a result of the execution of the OEM-defined chipset agnostic memory allocation module 174 at the serial peripheral interface (SPI) chip 160 as described herein. In the present specification and in the appended claims, the term "module" is meant to include that firmware, software, and/or a combination of firmware and software that is used during pre-boot, boot, and runtime stages as described herein. In some embodiments, at least some portion of the modules may be stored on a read-only memory device such as boot ROM 176 but some portion may also operate with software. It is appreciated, as well, that any of the modules described herein may be stored on a single or multiple ROM devices and may be addressable by the CPU (e.g., hardware processor 102) and the SPI chip 160. In the context of the present specification, the boot ROM 176 may be any type of memory that is non-volatile and, in some embodiments, prevents unauthorized access to the computer readable program code of the modules described herein. In an embodiment, the boot ROM 176 may be mask ROM, programmable ROM, erasable PROM (EPROM), electrically erasable PROM (EEPROM), flash memory, and the like.

As shown, the information handling system 100 may further include a video display device 144. The video display device 144, in an embodiment, may function as a liquid crystal display (LCD), an organic light emitting diode (OLED), a flat panel display, or a solid-state display. Although FIG. 1 shows a single video display device 144, the present specification contemplates that multiple video display devices 144 may be used with the information handling system to facilitate an extended desktop scenario, for example. Additionally, the information handling system 100 may include one or more input/output devices 142 including an alpha numeric input device such as a keyboard 146 and/or a cursor control device, such as a mouse 152, touchpad/trackpad 150, a stylus 148, or a gesture or touch screen input device associated with the video display device 144 that allow a user to interact with the images, windows, and applications presented to the user.

A network interface device of the information handling system 100 shown as wireless interface adapter 128 can provide connectivity among devices such as with Bluetooth® or to a network 136, e.g., a wide area network (WAN), a local area network (LAN), wireless local area network (WLAN), a wireless personal area network (WPAN), a wireless wide area network (WWAN), or other network. In an embodiment, the WAN, WWAN, LAN, and WLAN may each include an access point 138 or base station 140 used to operatively couple the information handling system 100 to a network 136. Wireless interface adapter 128 may include one or more radio frequency (RF) subsystems (e.g., radio 130) with transmitter/receiver circuitry, modem circuitry, one or more radio frequency (RF) front end 132 circuits, one or more wireless controller circuits, amplifiers, antennas 134 and other circuitry of the radio 130 such as one or more antenna ports used for wireless communications via multiple radio access technologies (RATs). In an embodiment, the wireless interface adapter 128 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15

WPAN standards, WWAN such as 3GPP or 3GPP2, Bluetooth® standards, or similar wireless standards may be used.

As described herein, the information handling system 100 includes a hardware processor 102 used to initiate a booting process as well as execute instructions (e.g., software and firmware) during pre-boot, boot, and runtime processes. In an embodiment, the hardware processor is a central processing unit (CPU). For ease of explanation, the present specification describes this hardware processor 102 as a CPU. However, the present specification contemplates that other hardware processing devices may be used to execute the software/firmware used during pre-boot, boot, and runtime processes.

During operation of the information handling system 100, a user may actuate a power button or otherwise cause power, via the power management unit (PMU) 122, to be supplied to the hardware within the information handling system 100 including the CPU. When power is provided to the CPU, an instruction located at a reset vector is executed that directs the CPU to a memory address where the BIOS firmware or, in some embodiments herein, the unified extensible firmware interface (UEFI) firmware is located. It is appreciated that the present specification contemplates that the systems and methods described herein may operate in either of those information handling systems 100 that execute either BIOS firmware or UEFI firmware. For ease of understanding, the present specification will be described in context of the information handling system 100 executing UEFI firmware.

The UEFI firmware and modules may include a variety of firmware and software that is processed by the CPU to complete a number of tasks prior to the invoking of the operating system (OS) and thereafter as well. For example, the CPU may execute power-on self-test (POST) firmware that takes control of the information handling system 100 after the power has been turned on. In an embodiment, the POST firmware is stored on a non-volatile memory device such as read-only memory (ROM), erasable programmable read-only memory (EPROM), electrically erasable programmable read-only memory (EEPROM), flash memory, NAND flash memory, NOR flash memory, and the like. It is appreciated that although some of these memory devices are non-volatile memory devices, some may be erasable in large data blocks. However, it is further appreciated that security controls may be implemented to prevent unauthorized access to the modules and firmware stored thereon in order to protect the modules and firmware stored thereon. Although the present specification describes this non-volatile memory device as a ROM memory device these other types of non-volatile memory devices are also contemplated to store the firmware described herein. In an embodiment, the firmware and modules may be stored at multiple locations with memory addressing used to point to the various types of firmware described herein. The POST firmware, when executed by the CPU, may perform a series of diagnostic tests to check the hardware components and ensure they are functioning properly. These tests typically include checking the CPU, memory (RAM), storage devices, graphics card, and other peripherals and hardware within the information handling system 100 to validate these hardware devices and ensure that they are working and meet required specifications to operate with each other. In an embodiment, the execution of the POST firmware as well as any other module (e.g., 162, 64, 166, 168, 170, and 174) causes the CPU and SPI chip 160 to manage ACPI-reserved memory space and locations on the RAM (e.g., main memory 106) for pre-boot, boot, and runtime phases or stages of the systems and methods described herein.

Other sets of firmware may subsequently be executed by the CPU in order to progress through the pre-boot, boot, and runtime processes associated with the operation of the information handling system 100. For example, the CPU may direct that pre-extensible firmware interface (PEI) module 162, driver execution environment (DXE) module 164, boot device selection (BDS) module 166, advanced configuration and power interface (ACPI) module 168, and pre-boot authentication/recovery tool (PBA/RT) module 170, as well as the OS 116 be utilized and invoked with computations and data associated with the execution of these modules being stored onto the RAM device for access by the CPU when needed. It is these modules that use the reserved allocated memory portions on the RAM. In an embodiment, the CPU may implement a flash memory controller that uses, for example, serial peripheral interface protocols to fetch the firmware, modules, and software for the CPU to access and execute. In an embodiment, this flash memory controller may be a serial peripheral interface chip that acts as an interface between the CPU and a ROM device where this firmware, modules, and software is stored. In an embodiment, this SPI chip 160 may include some processing resources such as read/write processing resources and may also include a flash memory storage device for transmission of this firmware, modules, and software during the pre-boot, boot, and runtime processes.

The PEI module 162, for example, may be executed by the CPU from the ROM to initialize the CPU and the RAM as well as the UEFI services required for the subsequent stages of the pre-boot, boot, and runtime processes. In an embodiment, these PEI services allow the PEI drivers and modules defined by the PEI module 162 to interact with the hardware within the information handling system 100. One aspect of the PEI stage initiated via the invoking of the PEI module 162 by the SPI chip 160 and execution of the PEI module 162 by the CPU is the memory initialization and configuration. Initialization allows the CPU to discover the volatile memory device (e.g., the RAM) and dictate the memory read/write timing, as well as establishing a memory map for the operating system to use for the PEI stage and later stages in the boot up such as the DXE stage, the BDS stage, and the ACPI stage of the pre-boot, boot, and runtime processes. However, in regular operation of the execution of the PEI module 162 as well as the DXE module 164, BDS module 166, and ACPI module 168, the memory map as defined by the execution of this firmware includes dedicated RAM memory allocations that are reserved for use by each of these sets of firmware. Via execution of these modules during this regular operation, there is no common memory type among the pre-boot, boot, and runtime processes that previous systems initialize. Stages and reserved memory in RAM for these stages are fixed such that some RAM is inaccessible in previous systems. This usage of RAM is potentially inefficient and wasteful. The memory map generated under the PEI stage during this regular operation is a static memory map with the memory allocated to, for example, the PEI module 162 and tightly coupled with the chipset vendor and OEMs-defined allotment. Memory divisions, reallocations, or repurposing are not possible based on the set allocation of memory defined by the execution of the PEI module 162 (and the DXE module 164, BDS module 166, and ACPI module 168) under previous systems.

In an embodiment of the present disclosure, in order to allow for dynamic memory allocation for each stage of the pre-boot, boot, and runtime processes, the firmware includes an OEM-defined chipset agnostic memory allocation module 174. The SPI chip 160 may be directed, by the CPU, to invoke or utilize the OEM-defined chipset agnostic memory allocation module 174 to execute the methods described herein. In an embodiment, the CPU directs the SPI chip 160 to invoke the OEM-defined chipset agnostic memory allocation module 174 prior to the PEI module 162 being invoked such that the dynamic memory allocation may be completed through all stages of the pre-boot, boot, and runtime processes via establishing a virtual memory interface allowing for redefinition and changes to the custom pre-boot, boot, or runtime memory types in the custom memory type layout. It is appreciated, however, that the invoking or utilization of the OEM-defined chipset agnostic memory allocation module 174 may be completed during any pre-boot, boot, and runtime processes. The execution of the OEM-defined chipset agnostic memory allocation module 174 is capable of reallocating and reassigning reserved RAM memory to a different type of memory when those sections of RAM memory are not being used by any previous pre-boot, boot, and runtime processes and could be repurposed for the later stages of the pre-boot, boot, and runtime processes to improve RAM utilization with a scalable RAM memory layout for those portions of RAM reserved for pre-boot and boot phases, thus allowing less RAM to be allocated for pre-boot and boot operations or allowing for more RAM to be available for each phase as those phases transition during the pre-boot and boot operations and for runtime.

The execution of the OEM-defined chipset agnostic memory allocation module 174 provides for the CPU during the pre-boot, boot, and runtime a firmware-controlled system to dynamically adjust and allocate memory within the RAM device via adjustments to ACPI-reserved RAM memory map during pre-boot, boot, or runtime operations with a virtual interface that operates as a dynamically adjustable memory map. This results in an OEM defined memory layout 172 within the RAM or other main memory 106 that is defined by a memory map maintained for a particular information handling system 100. Further, this memory map is dynamically adjustable on the SPI chip 160 as phases of pre-boot, boot, or runtime operations progress via the OEM-defined chipset agnostic memory allocation module 174. Consequently, with the OEM defined memory layout 172, the systems and methods described herein further use signed memory headers that securely redefine the virtual interface for the allocated reserved portions of the memory device for each of the plural stages of the boot module execution through pre-boot, boot, and runtime. Additionally, the execution of the OEM-defined chipset agnostic memory allocation module 174 allows for protected memory extensions across modules, boot time to runtime, and across reboots. Further, the execution of the OEM-defined chipset agnostic memory allocation module 174 allows the CPU to create customized embedded memory macros to support architecture independent memory types over pre-boot, boot, and runtime processes to allow such dynamic memory map adjustments to repeat during subsequent boot operations, such as during reboot. Even further, the execution of the OEM-defined chipset agnostic memory allocation module 174 by the CPU allows the CPU to initiate dynamic memory trialing protocols that search the RAM device and memory locations therein for non-reserved memory locations that can be used by any pre-boot, boot, and runtime stages thereby reducing, potentially, the amount of memory used during these processes. As a result of executing the OEM-defined chipset agnostic memory allocation module 174 with the CPU, the memory space within the RAM is dynamically customized in an OEM-defined memory layout 172 and a memory map may be stored and adjusted at the SPI chip 160 while any pre-boot, boot, and runtime processes are executed at the information handling system 100.

In an embodiment, the information handling system 100 can include one or more sets of machine-readable code instructions, parameters, and profiles 112 that can be executed to cause the computer system to perform any one or more of the methods or computer-based functions disclosed herein. For example, machine-readable code instructions, parameters, and profiles 112 may execute, via hardware processing resources, various software applications, software agents, the BIOS 114 firmware and/or software, the OEM-defined chipset agnostic memory allocation module 174, or other aspects or components. Machine-readable code instructions, parameters, and profiles 112 may execute, via the information handling system 100, the OEM-defined chipset agnostic memory allocation module 174 that is used to allocate and repurpose memory usage within the information handling system. Again, the machine-readable code instructions, parameters, and profiles 112 described herein may be stored on a non-volatile memory device and made accessible to the EC 104, the hardware processor 102, a microcontroller unit (MCU), or other hardware processing resource for execution. Various software modules comprising application instructions of machine-readable code instructions, parameters, and profiles 112 may be coordinated by an operating system (OS) 116, and/or via an application programming interface (API). An example OS 116 may include Windows®, Android®, and other OS types known in the art. Example APIs may include Win 32, Core Java API, or Android APIs.

In an embodiment, the disk drive unit 120 and may include machine-readable code instructions, parameters, and profiles 112 in which one or more sets of machine-readable code instructions, parameters, and profiles 112 such as software can be embedded to be executed by the processor 102 or other hardware processing devices such as a GPU 154 to perform the processes described herein. Similarly, main memory 106 and static memory 108 may also contain a computer-readable medium for storage of one or more sets of machine-readable code instructions, parameters, or profiles 112 described herein. The disk drive unit 120 or static memory 108 also contain space for data storage. Further, the machine-readable code instructions, parameters, and profiles 112 may embody one or more of the methods as described herein. In a particular embodiment, the machine-readable code instructions, parameters, and profiles 112 may reside completely, or at least partially, within the main memory 106, the static memory 108, and/or within the drive unit 120 during execution by the hardware processor 102, EC 104, or GPU 154 of information handling system 100. The main memory 106, GPU 154, EC 104, and the hardware processor 102 also may include computer-readable media.

Main memory 106 or other memory of the embodiments described herein may contain computer-readable medium (not shown), such as RAM in an example embodiment. An example of main memory 106 includes random access memory (RAM) such as static RAM (SRAM), dynamic RAM (DRAM), non-volatile RAM (NV-RAM), or the like. The information handling system 100 may also have read-only memory (ROM), another type of memory, or a combination thereof. Static memory 108 may contain computer-readable medium (not shown), such as NOR or NAND flash memory in some example embodiments. The applications and associated APIs, for example, may be stored in static memory 108 or on the disk drive unit 120 that may include access to a machine-readable code instructions, parameters, and profiles 112 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 122 (a.k.a. a power supply unit (PSU)). The PMU 122 may include a hardware controller and executable machine-readable code instructions to manage the power provided to the components of the information handling system 100 such as the hardware processor 102, and other hardware components described herein. The PMU 122 may control power to one or more components including the one or more drive units 120, the hardware processor 102 (e.g., CPU), the EC 104, the GPU 154, a video/graphic display device 144, or other wired input/output devices 142 such as the stylus 148, a mouse 152, a keyboard 146, and a trackpad 150 and other components that may require power when a power button has been actuated by a user. In an embodiment, the PMU 122 may monitor power levels and be electrically coupled, either wired or wirelessly, to the information handling system 100 to provide this power and coupled to bus 118 to provide or receive data or machine-readable code instructions. The PMU 122 may regulate power from a power source such as a battery 124 or AC power adapter 126. In an embodiment, the battery 124 may be charged via the AC power adapter 126 and provide power to the components of the information handling system 100, via wired connections as applicable, or when AC power from the AC power adapter 126 is removed. PMU 122 may include a hardware controller to operate with the EC 104 separately or together to execute machine-readable code instructions, parameters, and profiles 112 of the OEM-defined chipset agnostic memory allocation module 174 at the information handling system 100.

In a particular non-limiting, exemplary embodiment, the computer-readable medium can include a solid-state memory such as a memory card or other package that houses one or more non-volatile read-only memories or volatile type memory. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, ARM® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
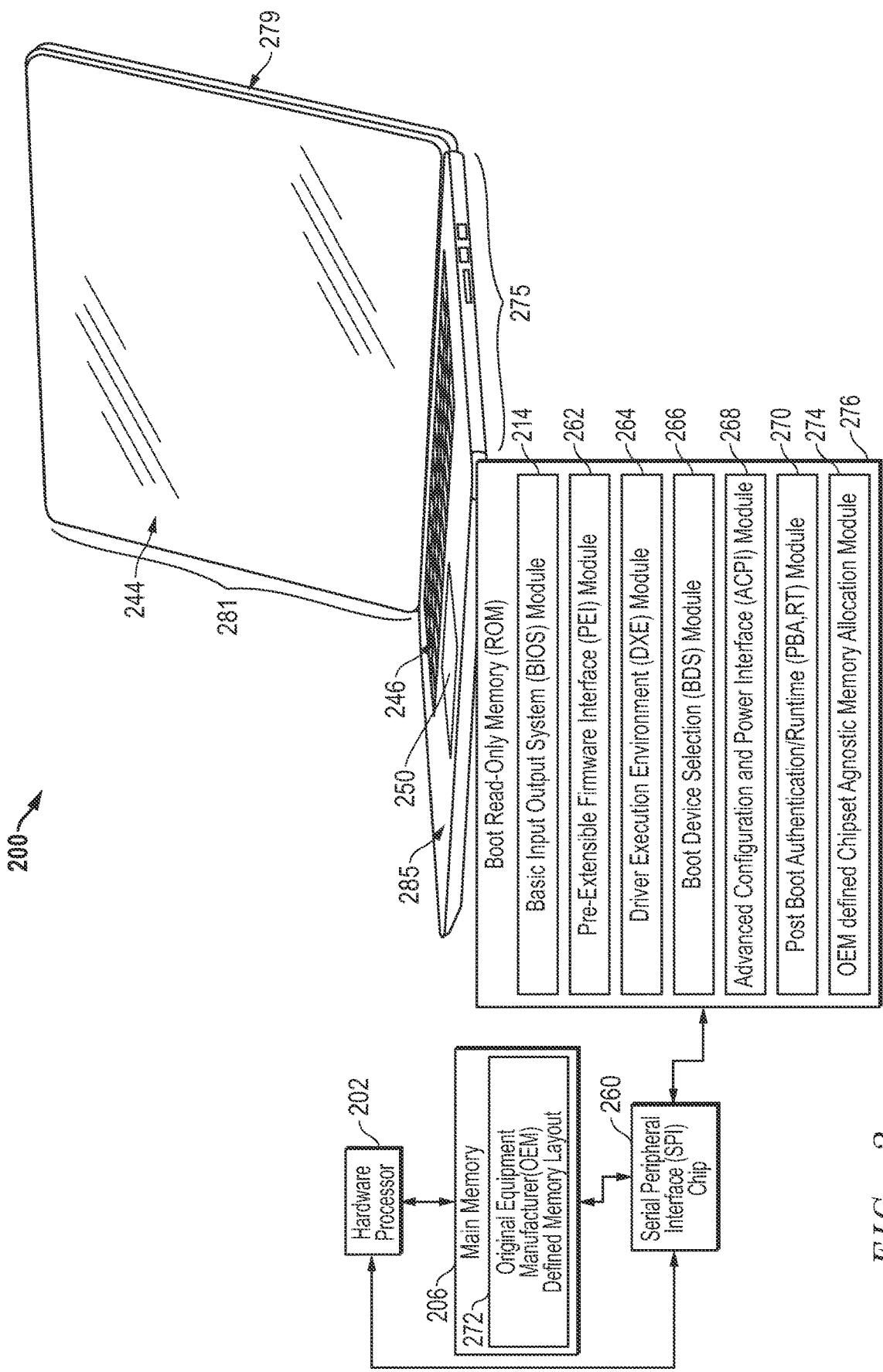
FIG. 2 is a graphic diagram of an information handling system including an original equipment manufacturer-agnostic (OEM-agnostic) memory allocation firmware executable by a hardware processor used to allocate and repurpose memory usage within the information handling system according to another embodiment of the present disclosure.

FIG. 2 is a graphic diagram of an information handling system 200 including an OEM-defined chipset agnostic memory allocation module 274 executable by a hardware processor 202 used to allocate and repurpose memory usage within the information handling system 200 according to another embodiment of the present disclosure. As described herein, the information handling system 200 includes a hardware processor 202 such as a CPU that, when activated, instructs a SPI chip 260 to invoke various modules including the OEM-defined chipset agnostic memory allocation module 274 as described herein.

The information handling system 200 may include a plurality of chassis made of metal, plastic, or the like. The information handling system 200, in one embodiment, may comprise an outer case or shell of an information handling system 200 for housing internal components of the information handling system 200, such as a video display device 244 (e.g., a built-in video display device 244), a cursor control device (e.g., built-in trackpad or touchpad 250), and an alpha numeric input device (e.g., built-in keyboard 246). As shown in FIG. 2, the information handling system 200 may include a built-in video display device 244 functioning to enclose the display chassis 281 with the back display chassis 279 described herein.

As another example embodiment, the information handling system 200 may further include the keyboard chassis 285 functioning to enclose a cursor control device such as a trackpad 250 and/or the built-in keyboard 246 acting as an alpha numeric input device. The back display chassis 279 and the video display device 244 may be joined together in an embodiment to form a fully enclosed display chassis 281, while the keyboard chassis 285 and a bottom chassis 273 may be joined together to form a fully enclosed base chassis 275. Taking a closed configuration as a reference position of the video display device 244 including the back display chassis 279 and the base chassis 275 including the keyboard chassis 285 and bottom chassis 273, the video display device 244 and back display chassis 279 may be rotated away from the base chassis 275 into the laptop configuration as shown in FIG. 2.

As described herein, in order to allow for dynamic memory allocation for each stage of the pre-boot, boot, and runtime processes, the firmware includes an OEM-defined chipset agnostic memory allocation module 274. The SPI chip 260 may be directed, by the CPU or other hardware processor 202, to invoke or utilize the OEM-defined chipset agnostic memory allocation module 274 to execute the methods described herein. In an embodiment, the CPU directs the SPI chip 260 to invoke the OEM-defined chipset agnostic memory allocation module 274 prior to the PEI module 262 and other modules (e.g., 264, 266, 268, and 270) being invoked from firmware in ROM 276 such that the dynamic memory allocation of portions of reserved boot memory in main memory device 206 may be completed through all stages of the pre-boot, boot, and runtime processes via establishing a virtual memory interface allowing for redefinition and changes to the custom pre-boot, boot, or runtime memory types in the custom memory type layout.

Other sets of firmware and modules may subsequently be executed by the hardware processor CPU 202 in order to progress through the pre-boot, boot, and runtime processes associated with the operation of the information handling system 200. For example, the CPU 202 may direct that PEI module 262, DXE module 264, BDS module 266, ACPI module 268, and PBA/RT module 270, as well as the OS be utilized and invoked with computations and data associated with the execution of these modules being stored onto the RAM device for access by the CPU 202 when needed. It is appreciated that the invoking of the OEM-defined chipset agnostic memory allocation module 274 may be completed during any pre-boot, boot, and runtime processes. The execution of the OEM-defined chipset agnostic memory allocation module 274 is capable of reallocating and reassigning reserved RAM memory on main memory 206 to different portions of the memory reserved for boot stages when those sections of RAM memory 206 are not being used by any of the previous pre-boot, boot, and runtime processes. These portions of main memory RAM device 206, are thus repurposed for the later stages of the pre-boot, boot, and runtime processes to improve RAM utilization with a scalable RAM memory layout.

The execution of the OEM-defined chipset agnostic memory allocation module 274 provides for the CPU 202 during the pre-boot, boot, and runtime a firmware-controlled system to dynamically adjust and allocate memory within the RAM device 206 via adjustments to ACPI-reserved RAM memory map during pre-boot, boot, or runtime operations. This results in an OEM defined memory layout 272 within the RAM or other main memory 206 that is defined by a memory map maintained and dynamically adjustable on the SPI chip 260. Consequently, with the OEM defined memory layout 272, the systems and methods described herein further use signed memory headers that securely redefine the virtual interface for the allocated reserved portions of the memory device for each of the plural stages of the boot module execution through pre-boot, boot, and runtime. Additionally, the execution of the OEM-defined chipset agnostic memory allocation module 274 allows for protected memory extensions across modules, boot time to runtime, and across reboots. Further, the execution of the OEM-defined chipset agnostic memory allocation module 274 allows the CPU 202 to create customized embedded memory macros to support architecture independent memory types over pre-boot, boot, and runtime processes. Even further, the execution of the OEM-defined chipset agnostic memory allocation module 274 by the CPU 202 allows the CPU 202 to initiate dynamic memory trialing protocols that search the RAM device 206 and memory locations therein for non-reserved memory locations that can be used by any pre-boot, boot, and runtime stages thereby reducing, potentially, the amount of memory used during these processes. As a result of executing the OEM-defined chipset agnostic memory allocation module 274 with the CPU 202, the memory space within the RAM 206 is dynamically customized in an OEM-defined memory layout 272 and a memory map may be stored and adjusted at the SPI chip 260 while any pre-boot, boot, and runtime processes are executed at the information handling system 200.

Figure 3:
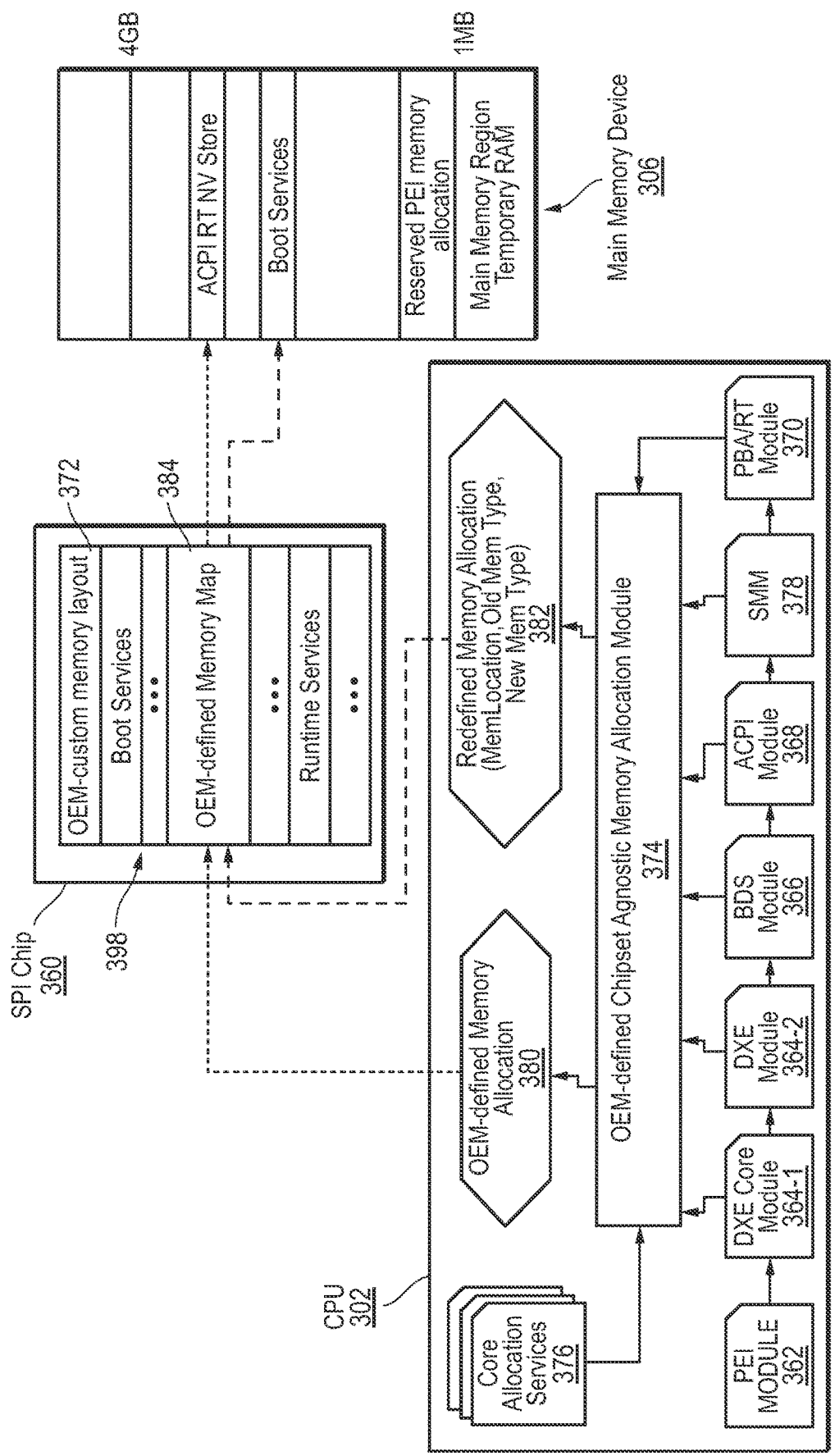
FIG. 3 is a block diagram of a memory reallocation and repurposing system for portions of a main memory device reserved for pre-boot and boot up operations by a hardware processing device via an SPI chip resulting from the execution of original equipment manufacturer (OEM) agnostic memory allocation firmware according to an embodiment of the present disclosure.

FIG. 3 is a block diagram of a memory allocation and repurposing system for reallocating reserved portions of RAM memory device 306 by a hardware processing device 302 via an SPI chip 360 resulting from the execution of the OEM-defined chipset agnostic memory allocation module 374 according to an embodiment of the present disclosure. FIG. 3 shows the various pre-boot, and boot modules invoked from firmware and/or software via the SPI chip 360 for execution by the hardware processing device such as the CPU 302. Again, these modules may include PEI module 362, DXE module, BDS module 366, ACPI module 368, and PBA/RT module 370 among other modules, firmware, and/or software that an OEM may have required for boot-up of the information handling system.

FIG. 3 also shows the particularized DXE module 364 being separated into two different allocated memory partitions: a DXE core module 364-1 and a DXE module 364-2 both of which may be described as being part of the DXE module stored on a ROM memory device and used during the DXE stage of the pre-boot process. Further additional modules, firmware, and/or software may also be invoked such as the system management mode (SMM) module 378 used to, in an example embodiment, operate at a highly privileged level and provide system-level management and control for system-level management tasks, such as power management, hardware configuration, thermal management, and low-level system monitoring. The SMM module 378 may also provide a secure and isolated execution environment that can intercept and handle critical events before they reach the operating system thereby protecting against malware, unauthorized access, and other security threats to the information handling system. Additionally, FIG. 3 shows that core allocation services 376 may include modules that, when executed by the CPU 302, manage and allocate system resources to different components, such as the OS, drivers, and applications. The services provided via execution of the core allocation services 376 ensures that each component receives the necessary CPU cores or processing resources to perform their respective tasks. It is appreciated that other types of modules may be accessible to and invoked by the CPU 302 via the SPI chip 360 during the pre-boot, boot, and runtime stages of the information handling system and the present specification contemplates that these types of modules may also be executed.

FIG. 3 shows that each of the different types of modules are invoked by the CPU 302 for execution via the SPI chip 360 for use with reserved memory portion of RAM 306 by the OEM-defined chipset agnostic memory allocation module 374. The OEM-defined chipset agnostic memory allocation module 374 may be executed to recognize that the OEM has provided OEM-defined memory allocation 380 for use by the CPU 302 for reserved portions of the main memory 306 to define the memory locations and space where the main memory RAM device 302 is dedicated for these operations. Again, in operation of the OEM-defined memory allocation 380, a predetermined amount of memory storage on the main memory device 306 is used for each set of modules for pre-boot, boot, or runtime, even when that module is no longer needed in subsequently pre-boot, boot, and runtime processes unless reallocated by the OEM-defined chipset agnostic memory allocation module 374 according to embodiments herein. With execution of the OEM-defined chipset agnostic memory allocation module 374, the storage space in the main memory device 306 that is reserved for this each module is repurposed, redefined, or otherwise reused by any other pre-boot, boot, or runtime processes according to embodiments herein.

The execution of the OEM-defined chipset agnostic memory allocation module 374 described herein by the CPU 302 allows the CPU 302 to redefine, repurpose, and reuse reserved memory space for these executed modules in the main memory device 306 as these modules are invoked during various sequential stages of pre-boot, boot up, and runtime. In effect, the execution of the OEM-defined chipset agnostic memory allocation module 374 by the CPU 302 creates redefined memory allocation (MemLocation, Old Mem Type, New Mem Type) 382 for a virtual interface with the main memory device 306 such that portions of memory device 306 that were specifically allocated and reserved to one or more sets of firmware, modules, and software may be freed and used for subsequent modules, firmware, and software during pre-boot, boot, and runtime phases as they progress. How much to reallocate may depend on the information handling system and OEM specifications for required amounts or reserved RAM for those stages of pre-boot, boot, or runtime. The SPI chip 360, being the intermediary from the pre-boot, boot, and runtime firmware module as well as for the CPU 302 to access portions of reserved main memory device 306, may utilize a virtual memory interface 398 to redefine the OEM-defined memory map 384 based on the redefined memory allocation (MemLocation, Old Mem Type, New Mem Type) 382 created via the execution of the OEM-defined chipset agnostic memory allocation module 374 as stages of pre-boot, boot, and runtime progress. This is done by establishing the virtual memory interface 398 allowing for the redefinition and reallocation of reserved memory space on the RAM main memory 306 during a custom pre-boot, boot, or runtime memory types in the custom memory type layout. This virtual interface may also provide a mechanism to change the memory type and reallocate the memory type from pre-boot stages, through boot services to runtime services as those stage progress during boot up via execution of the OEM-defined chipset agnostic memory allocation module 374. This virtual interface 398 may also be used with generated signatures that when used for the memory reallocation and memory redefinitions by the OEM-defined chipset agnostic memory allocation module 374 can secure reallocation of the OEM custom memory allocations and allow for the virtual interface to reassign those memory locations and utilize the signatures for access via the virtual memory interface 398. With these generated signatures, signed headers may be used to securely direct the CPU 302 to the reallocated locations of data on the main memory device 306 (e.g., RAM) for varying stages of pre-boot, boot, and later runtime operations.

The redefined OEM-defined memory map 384 may be referred to by the CPU 302 when addressing the location to specific data during pre-boot, boot, and runtime processes and may reference those memory addresses within the portions of main memory device 306 (e.g., RAM) that have been designated as being reallocated for use in these processes by the OEM-defined chipset agnostic memory allocation module 374. This creates an OEM-custom memory layout 372 that may increase the efficiency of use of the memory space within the main memory device 306. Furthermore, OEM-signed memory headers may be used by the SPI chip 360 to support protected memory extensions across modules, boot time to runtime, and across reboots.

Again, as described herein, the reallocation of the memory space within the main memory device 306 may be useful even through to the ACPI module 368 execution and PBA/RT module 370 execution stages of the boot processes. In an example embodiment, because the reserved memory used for each pre-boot, boot, and runtime stage has been reallocated in the main memory device 306 during the progression of those processes, the OEM-defined memory map 384 may reflect this reallocation and the OEM-defined chipset agnostic memory allocation module 374 saves that memory map across reboots such that when memory has been reallocated once, that reallocation will be reflected in subsequent pre-boot, boot, and runtime processes as the stages progress. Further, because the OEM-defined chipset agnostic memory allocation module 374 is a trusted firmware module stored on the ROM device and utilizes the signatures for security when reallocating the virtual memory interface 398, a system reboot is not necessary when dynamic reallocation of memory is conducted during boot up.

During operation and when power is first provided to the CPU 302, an instruction located at a reset vector associated with the CPU 302 is executed that directs the CPU 302 to a memory address where the BIOS firmware or, in some embodiments herein, the unified extensible firmware interface (UEFI) firmware is located. The UEFI firmware and modules may include a variety of firmware and software that is processed by the CPU 302 to complete a number of tasks prior to the invoking of the operating system (OS) and thereafter as well. For example, the CPU 302 may execute power-on self-test (POST) firmware that takes control of the information handling system 100 after the power has been turned on. The POST firmware, when executed by the CPU 302, may perform a series of diagnostic tests to check the hardware components and ensure they are functioning properly. These tests typically include checking the CPU 302, memory (RAM) 306, storage devices, graphics card, and other peripherals and hardware within the information handling system to validate these hardware devices and ensure that they are working and meet required specifications to operate with each other. In an embodiment, the execution of the POST firmware as well as any other module (e.g., 362, 364-1, 364-2, 366, 368, 378, 370) causes the CPU 302 and SPI chip 360 to manage ACPI-reserved memory space and locations on the RAM main memory device 306 for each of the pre-boot, boot, and runtime phases or stages of the systems and methods described herein.

Other sets of firmware and modules are subsequently executed by the CPU 302 in order to progress through the pre-boot, boot, and runtime processes associated with the operation of the information handling system 100. As described, the CPU may direct that PEI module 362, DXE modules 364-1 and 364-2, BDS module 366, ACPI module 368, and PBA/RT module 370 be utilized and invoked with computations and data associated with the execution of these modules being stored onto the reserved portions of main memory device 306 for access by the CPU 302 when needed during pre-boot and boot phases or after boot during runtime. It is these modules that use the reserved allocated memory portions on the RAM memory device 306 that may have those reserved allocated portions reallocated via execution of the OEM-defined chipset agnostic memory allocation module 374 according to embodiments herein.

This process allows the SPI chip 360 to create an OEM-defined memory map 384 that is a virtual memory interface 398 that includes signed headers to reallocated portions of the reserved main memory device 306 for dynamic reallocation of reserved portions of RAM memory device 306 where data associated with the execution of the pre-boot, boot, and runtime modules, firmware, and/or software is able to be stored. In an embodiment of the present disclosure, the execution of the OEM-defined chipset agnostic memory allocation module 374 allows for protected memory extensions across modules, boot time to runtime, and across reboots. Further, the execution of the OEM-defined chipset agnostic memory allocation module 374 allows the CPU 302 to create customized embedded memory macros to support architecture independent memory types over pre-boot, boot, and runtime processes for reallocation of portions of memory as pre-boot, boot, and runtime stages progress. Even further, the execution of the OEM-defined chipset agnostic memory allocation module 374 by the CPU 302 allows the CPU 302 to initiate dynamic memory trialing protocols that search the RAM device 306 and memory locations therein for non-reserved memory locations that can be used by any pre-boot, boot, and runtime stages thereby reducing, potentially, the overall amount of memory reserved during these processes or providing additional memory resources for some stages or module executions above what might otherwise be available. As a result of executing the OEM-defined chipset agnostic memory allocation module 374 with the CPU 302, the reserved portions of memory space within the RAM memory device 306 for pre-boot, boot and some runtime operations is dynamically customized in an OEM-defined memory layout 372 and a memory map 384 that may be stored and adjusted at the SPI chip 360 while any pre-boot, boot, and runtime processes are executed at the information handling system.

FIG. 4A is a block diagram of a memory reallocation at a main memory device by a hardware processor 402 and an SPI chip 460 via execution of original equipment manufacturer (OEM) defined agnostic memory allocation module 474 according to another embodiment of the present disclosure. FIG. 4A shows the utilization of the various firmware, modules, and software with the UEFI firmware 486 to define OEM-defined scalable memory headers 484 to generate OEM defined memory allocation 480 as determined by an OEM and then redefined memory allocation 482 for a virtual memory interface 498 through the SPI chip 460. Such determined OEM defined memory allocation 480 and redefined memory allocations 482 are determined for pre-boot and boot modules such as PEI module 462, DXE module 464, PBA/RT module 470 and other via execution of the OEM defined agnostic memory allocation module 474 by the hardware processing device 402 such as the CPU. Again, this UEFI firmware 486 may include execution of various pre-boot and boot stage operations via PEI module 462, DXE module 464, BDS module 466, ACPI module (not shown), and PBA/RT module 470 among other modules, firmware, and/or software that an OEM may have required for boot-up of the information handling system. It is appreciated that other types of firmware may be part of the UEFI firmware 486 execution of stages of pre-boot, boot, and runtime operations that utilize reserved portions of the RAM memory 406 such as those described herein. These other types of UEFI firmware 486 (or BIOS firmware in some embodiments) are contemplated by the present specification and the principles and methods described herein may apply to those other types of UEFI firmware 486 as well.

Figure 4:
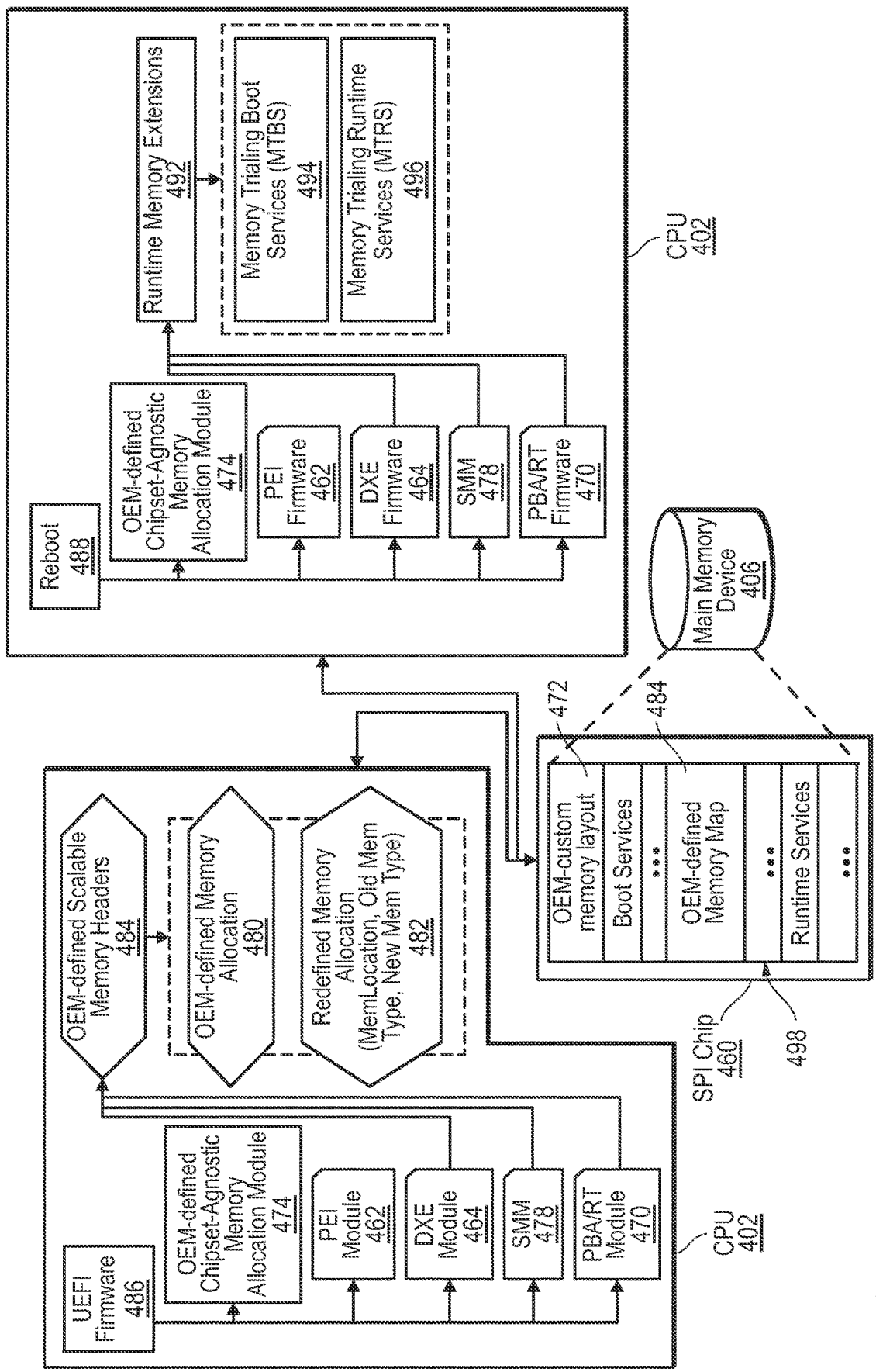
FIG. 4 is a block diagram of a memory reallocation at portions of a main memory device reserved for pre-boot and boot up operations by a hardware processor and an SPI chip via execution of original equipment manufacturer (OEM) agnostic memory allocation module according to another embodiment of the present disclosure.

FIG. 4 shows that as each of the different types of UEFI firmware 486 are addressed by the CPU 402 via the SPI chip 460 to reserved portions of RAM main memory 406 during the boot-up processes described herein. The OEM-defined chipset agnostic memory allocation firmware 474 may recognize that the OEM has provided OEM-defined memory allocation 480 for use by the CPU and at the main memory 406 to define the reserved memory locations in memory device 406 where data associated with the execution of the firmware, modules, and software is to be stored and read from by the CPU 402 or other hardware processing device used to boot up the information handling system. Again, in operation of the OEM-defined memory allocation 480, such a predetermined and reserved amount of memory storage on the main memory device 406 is used for each set of firmware and module even when that data stored on the reserved locations of the main memory device 406 is no longer needed when stages of pre-boot or boot operations progress to subsequent pre-boot, boot, and runtime processes. The OEM-defined memory allocation 480 may be reallocated by the OEM defined agnostic memory allocation module 474 from the storage space reserved for this firmware as repurposed, redefined, or otherwise reused by any other pre-boot, boot, or runtime processes in later stage of the pre-boot and boot process as well as later runtime application.

The execution of the OEM-defined chipset agnostic memory allocation firmware 474 described herein by the 402 redefines, repurposes, and reuses at least some portions of memory space in the main memory device 406 as the firmware is executed by reallocating reserved memory for use with the execution of other modules described herein. In effect, the execution of the OEM-defined chipset agnostic memory allocation firmware 474 by the CPU 402 creates redefined memory allocation (MemLocation, Ole Mem Type, New Mem Type) 482 within the main memory device 406 such that memory that was specifically allocated and reserved for the purpose of one or more sets of firmware may be freed and used for processing of other modules and firmware which is communicated to the virtual interface at the SPI chip 460. The SPI chip 460, being the intermediary from the ROM where the firmware for the pre-boot and boot modules are located, as well as between the main memory device 406 and CPU 402 during execution of stages of pre-boot and boot operations of the modules such as 462, 464 or 470, may also alter, in real-time, the OEM-defined memory map 484 based on the redefined memory allocation (MemLocation, Old Mem Type, New Mem Type) 482 in a virtual memory interface 498. This redefined memory allocation (MemLocation, Old Mem Type, New Mem Type) 482 is created via the execution of the OEM-defined chipset agnostic memory allocation module 474 for dynamic adjustments to reserved portions of RAM memory device 406. This redefined OEM-defined memory map 484 may be referred to by the CPU when addressing the location to specific data associated with executed firmware during pre-boot, boot, and runtime processes such as for the PEI module 462 execution, DXE module 464 execution, ACPI module execution, PBA/RT module 470 execution, or other module executions during pre-boot, boot, and during runtime. Additionally, the OEM-defined memory map 484 with redefined memory allocation (MemLocation, Old Mem Type, New Mem Type) 482 may be used to refer to those memory addresses within reallocated portions the reserved main memory device 406 (e.g., RAM) that have been designated and are being repurposed for use in these subsequent pre-boot, boot, or runtime processes. This creates an OEM-custom memory layout 472 that may increase the efficiency of use of the memory space within the main memory device 406. Furthermore, OEM-signed memory headers may be used by the SPI chip 360 to support protected memory extensions across modules, boot time to runtime, and across reboots. In an embodiment, the execution of the OEM-defined chipset agnostic memory allocation firmware 474 creates a virtual memory interface 498 that allows for the redefinition and reallocation of reserved memory space on the RAM memory device 406 during a custom pre-boot, boot, or runtime memory types in the custom memory type layout 473 and OEM-defined memory map that may be securely modified in the virtual memory interface. The virtual interface may also provide a mechanism to change the memory type and reallocate the memory type from boot services to runtime services. The virtual interface 498 may also be used for generated signatures used for the secure memory reallocation and memory redefinitions with the signatures being used to detect the OEM custom memory allocations as part of any redefined memory allocation (MemLocation, Old Mem Type, New Mem Type) 482. With these generated signatures, signed headers may be used to direct the CPU 402 to the reallocated locations of data on the main memory device 406 (e.g., RAM) via the virtual memory interface 498 on the SPI chip 460.

In an embodiment, the UEFI firmware 486, when executed, may allocate memory requests with the OEM common memory type, and allow for core services allocation. The OEM-defined memory allocation 480 may direct, initially, that certain UEFI firmware 486 be allocated a set amount of memory in the main memory 406 as defined, for example, by an OEM who prepares the boot firmware and software for execution on the information handling system being manufactured. This may be done according to customer specifications for particular enterprise uses of the information handling system for enterprise network and security capabilities or for other performance specifications required for customers of the information handling systems. Via execution of the OEM-defined chipset agnostic memory allocation firmware 474, the portions of reserved memory in the main memory 406 are reallocated and redefined, in whole or in part, as redefined memory allocation (MemLocation, Old Mem Type, New Mem Type) 482 within the main memory 406 as stages of pre-boot, boot, or runtime occur during boot up of the information handling system according to embodiments of the present disclosure. The execution of the OEM-defined chipset agnostic memory allocation firmware 474 may retrieve memory location addresses, determine the memory types for those addresses, and reallocate that memory, when necessary, using the OEM-defined scalable memory headers 490 as redefined memory allocations 482 within the virtual memory interface 498 for the SPI chip 460.

During operation of the information handling system during runtime, the execution of the OEM-defined chipset agnostic memory allocation firmware 474 may also find available persistent memory locations using memory trialing during the boot services (MTBS) 494 and memory trailing runtime services (MTRS) 496. As described herein, the execution of the OEM-defined chipset agnostic memory allocation firmware 474 by the CPU 402 allows the CPU 402 to initiate dynamic memory trialing protocols that search for non-volatile RAM locations for memory locations that can be reserved to store data from portions of RAM memory 406 and RAM memory allocations as mapped for any pre-boot, boot, and runtime stages for re-use during warm or cold reboots of the information handling system to avoid the need for further processing of the OEM-defined chipset agnostic memory allocation firmware 474 during reboots. In an embodiment, runtime memory extensions 492 may be used to determine whether a certain UEFI firmware 486 at a specific address in the main memory 406 that has been used and then reallocated or repurposed for use in other pre-boot, boot, and runtime processes reserves the same allocations and reallocations and some data for later reboots. This reduces, potentially, the amount of processing necessary and memory accesses needed for these processes while also expanding available memory used during any given stage of these pre-boot, boot, or even runtime processes pursuant to the previous dynamic memory allocation systems for warm and cold reboots. By determining via the MTBS 494 and MTRS 496 processes which data be stored and which portions of memory 406 are used at which pre-boot, boot, and runtime stages and can be repurposed and reallocated, memory space on the main memory 406 may be better used and processing for reserved memory portion management of the main memory device 406 may be minimized for reboots. For example, a driver or other firmware protocols that are not being referenced to during any remaining pre-boot, boot, or runtime processes or stages may be identified at the MTBS 494 and MTRS 496 and some data stored at identified non-volatile memory. Further, the virtual memory interface 498 as adjusted by redefined memory allocation 482 with OEM-defined scalable memory headers 484 may repurpose or reallocate these and store dynamically adjusted OEM defined memory maps 484 for other pre-boot, boot, or runtime services during later reboots. As a result of executing the OEM-defined chipset agnostic memory allocation firmware 474 with the CPU, the reserved memory space within the RAM 406 is dynamically customized in an OEM-defined memory layout 472 and the resulting OEM-defined memory map 484 that may be stored and used at the SPI chip 460 as a dynamically adjustable virtual memory interface 498 while any pre-boot, boot, and runtime processes are executed at the information handling system 400. This allows the OEM-defined memory map 484 to be used in boot up operations and later reboots 488 via UEFI firmware 486 operations of the information handling system. As described, MTBS 494 and MTRS 496 may be used to store data from reserved portions and store dynamic adjustments to the form the OEM-defined memory map 484 that is dynamically repurposed and reallocated for portions of memory space within the main memory 406 for efficient use of that memory during pre-boot, boot, and runtime phases of starting up an information handling system.

As described herein, the reallocation of the reserved memory space within the main memory device 406 may be useful even through the ACPI and PBA/RT stages of the boot processes. In an example embodiment, because memory has been reallocated in the main memory device 406 during pre-boot and boot stages as well as for runtime processes, the OEM-defined memory map 484 and dynamic iterations of the same for those stages and usages by modules 462, 464, 466, 470 and others may reflect this reallocation and save that memory map 484 in identified non-volatile memory or persistent memory along with data useful for those stages for use across reboots such that when memory has been reallocated at any stage, that reallocation and potentially some reusable data will be reflected in subsequent pre-boot, boot, and runtime processes after the information handling system has been shut down and subsequently turned on, when the information handling system has been restarted, or a reboot 488 process has been conducted.

Figure 5:
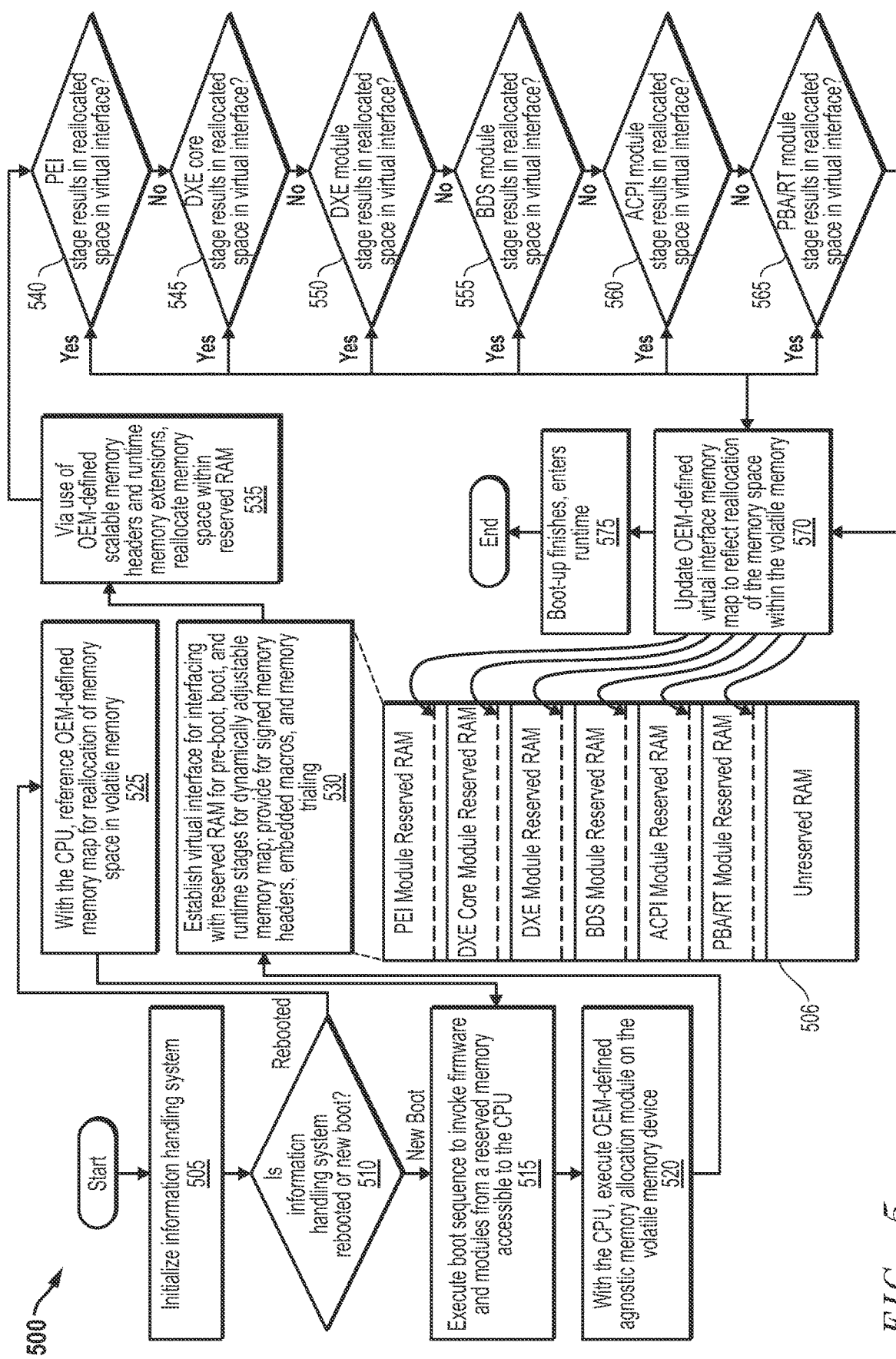
FIG. 5 is a process flow diagram of a method of booting an information handling system and reallocation at portions of a main memory device reserved for pre-boot and boot up operations via execution of original equipment manufacturer (OEM)-agnostic memory allocation firmware at a serial peripheral interface (SPI) chip according to an embodiment of the present disclosure.

FIG. 5 is a process flow diagram of a method 500 of booting an information handling system via execution of original equipment manufacturer (OEM)-agnostic memory allocation firmware at a serial peripheral interface (SPI) chip according to an embodiment of the present disclosure. The method 500 may include initializing the information handling system at block 505. In an embodiment, this may be done by the user actuating a power button on the information handling system or may be done as a result of a reboot process. As described herein, the actuation of the power button causes power to be provided to those hardware devices that are used to execute the systems and methods described herein. These hardware devices include, at least, a hardware processor such as a CPU, an SPI chip, ROM memory, and RAM memory.

At block 510, the CPU may determine whether the information handling system has been rebooted or if this was a new boot up process where the powering on of the information handling system is the first power cycle initiated. Rebooting of the information handling system also causes the OEM-defined chipset agnostic memory allocation module to be loaded and executed allowing for potential reallocation of reserved portions of memory in the main memory device, if necessary, in those situations where new firmware or drivers had been loaded into the information handling system during, for example, runtime by the user or updates are provided for reboot. The OEM-defined chipset agnostic memory allocation module may dynamically reallocate portions of memory for phases of pre-boot, boot, and runtime after reboot according to embodiments herein. As described herein, the execution of the OEM-defined chipset agnostic memory allocation module in a previous boot up process causes the creation of the OEM-defined memory layout that reflects the dynamic reallocation of reserved memory portions of the main memory during the PEI phase, the DXE phases, the BDS phases, the ACPI boot phase, and the PBA/RT phases of the pre-boot, boot, and runtime processes.

Where the CPU determines that the information handling system was rebooted at block 510, the method 500 may proceed to block 525 with the CPU referencing the OEM-defined memory map or maps stored via memory trialing in non-volatile memory including some data for portions of memory allocated during boot stages. The referenced OEM-defined memory maps are for reallocation of reserved memory space in the memory device such as the main memory device (e.g., RAM) 506 for pre-boot, boot, and runtime phases of boot up, or reboot, of the information handling system. After the CPU has referenced the OEM-defined memory map or maps stored pursuant to previous booting of the information handling system, the method 500 may continue to block 515 as described herein.

Returning to block 510, where the CPU determines that the initialization as a new boot and after power is provided to the CPU, an instruction located at a reset vector is executed that directs the CPU to a memory address where the BIOS firmware or, in some embodiments herein, and the unified extensible firmware interface (UEFI) firmware is located and execute that firmware at block 515. At block 515, the CPU may commence pre-boot or boot operations. For example, the UEFI firmware may include a variety of firmware that is executed by the CPU to complete a number of tasks prior to the loading of the operating system (OS) in pre-boot, and boot operations and thereafter in runtime as well. For example, the CPU may execute a POST module (e.g., POST firmware, software, or a combination thereof) that takes control of the information handling system after the power has been turned on. In an embodiment, the POST module, along with the other pre-boot, boot, and runtime modules, firmware, and software, is stored on a non-volatile memory device such as ROM, EPROM, EEPROM, flash memory, NAND flash memory, NOR flash memory, and the like. Although the present specification describes this non-volatile memory device as a ROM memory device these other types of non-volatile memory devices are also contemplated to store the firmware described herein. In an embodiment, the modules may be stored at multiple locations with memory addressing used to point to the various types of firmware described herein. The POST module, when executed by the CPU, may perform a series of diagnostic tests to check the hardware components and ensure they are functioning properly. These tests typically include checking the CPU, memory (RAM), storage devices 506, graphics card, and other peripherals and hardware within the information handling system to validate these hardware devices and ensure that they are working and meet required specifications to operate with each other.

Other sets of firmware and modules may subsequently be executed by the CPU in order to progress through the pre-boot, boot, and runtime processes associated with the operation of the information handling system. For example, the CPU may direct that a PEI module, DXE modules (e.g., DXE core module and DXE module), a BDS module, a ACPI module, and a PBA/RT module, as well as the OS be invoked by the SPI chip for execution by the CPU. For example, execution of the PEI module firmware may determine pre-boot available CPU, memory, and other hardware component utilization levels. Execution of DXE module firmware may provide for software features and drivers and determination of any OEM specific or other information handling system specific software features and drivers for initialization. The execution of the BDS module firmware determines and detects multiple devices, such as peripheral or other I/O devices that may be attached to the booting information handling system. The execution of the ACPI module firmware may provide an ACPI table with variables stored about the information handling system including such information about configurations with mouse and keyboard among other configuration variables. The PBA/RT module firmware may operate during runtime and access information stored and determined in previous pre-boot and boot phrases described, for example.

In one example embodiment, the CPU may use, for example, serial peripheral interface protocols to fetch the firmware and modules and, based on that executed firmware, reserved portions of RAM 506 for use during execution of the plural stages of boot module execution by the CPU. In an embodiment, the SPI chip acts as an interface between the CPU and a ROM device where this firmware and these boot modules are stored, but also provides for an interface, including a virtual interface for addressing the reserved portions of the RAM memory device 506 by the CPU during pre-boot, boot, and runtime phases. In an embodiment, this SPI chip may include some processing resources such as read/write processing resources for utilization and execution of firmware during the pre-boot, boot, and runtime processes and accesses to reserved portions of RAM memory.

The PEI module, for example, may be executed by the CPU from the ROM to initialize the CPU, the RAM and the ROM as well as the UEFI services required for the subsequent stages of the pre-boot, boot, and runtime processes. In an embodiment, these PEI services allow the PEI drivers and modules defined by the PEI module to interact with the hardware within the information handling system. One aspect of the PEI stage initiated via the invoking of the PEI module by the SPI chip and execution of the PEI module by the CPU is the memory initialization and configuration. Initialization allows the CPU to discover the volatile memory device (e.g., the RAM) and dictate the memory read/write timing, as well as establishing a memory map for the operating system to use for the PEI stage, the DXE stage, the BDS stage, and the ACPI stage of the pre-boot, boot, and runtime processes. However, in regular operation of the execution of the PEI firmware as well as the DXE firmware, BDS firmware, and ACPI firmware, and other pre-boot and boot phases, the memory map as defined by the execution of this firmware includes dedicated reserved memory allocations for use by each of these sets of firmware and modules. Via execution of these modules during this regular operation, there is no common memory type that may be adjustably redefined for variation among pre-boot, boot, and runtime processes. Still further, the memory map generated under the PEI stage, for example, during this regular operation is a static memory map with the memory allocated to the PEI module is tightly coupled with the chipset vendor and OEMs-defined allotment. Memory divisions are not possible based on the set allocation of memory defined by the execution of the PEI firmware (and the DXE firmware, BDS firmware, and ACPI firmware). Instead, the memory space reserved for the execution of the PEI module (or any other module) is not alterable in current systems.

In an embodiment, to allow for dynamic memory allocation for each stage of the pre-boot, boot, and runtime processes, the CPU may access firmware or software that includes an OEM-defined chipset agnostic memory allocation module at block 520. The OEM-defined chipset agnostic memory allocation module is executed by the CPU at any time during initiation of the UEFI firmware module and at commencement of other pre-boot, boot, and runtime phase firmware modules as described above. The SPI chip may be directed, by the CPU, to invoke the OEM-defined chipset agnostic memory allocation module, including OEM defined and redefined memory maps with a virtual memory interface to execute the methods described herein. In an embodiment, the CPU, via the SPI chip, executes the OEM-defined chipset agnostic memory allocation module prior to the PEI module being executed such that the dynamic memory allocation may be completed through all stages of the pre-boot, boot, and runtime processes. It is appreciated, however, that the execution of the OEM-defined chipset agnostic memory allocation module may be completed during any pre-boot, boot, and runtime processes with the execution of the OEM-defined chipset agnostic memory allocation module also being capable of reallocating and reassigning reserved RAM memory 506 to a different type of memory when those sections of RAM memory 506 are not being used by any previous pre-boot, boot, and runtime processes and could be repurposed for the later stages of the pre-boot, boot, and runtime processes.

At block 530, the method 500 includes establishing a virtual interface by the OEM-defined chipset agnostic memory allocation module at the SPI chip for interfacing with reserved RAM 506 for pre-boot, boot, and runtime stages to provide a dynamically adjustable memory map. As described herein, by creating this virtual interface used for creating the dynamically adjustable memory map, various additional processes are available such as the provision of signed memory headers, embedded macros, and memory trialing. For example, in an embodiment, the OEM-defined chipset agnostic memory allocation module may include the placement of signed memory headers for data generated and to be stored during the execution of the PEI module or any other pre-boot, boot, or runtime module for storage at a dynamically adjustable portion of RAM memory reserved for that PEI module or other module during pre-boot, boot, or runtime as those phases progress. Thus, for example, during the execution of the DXE firmware, the CPU may recognize a size, location, attribute, and dependency of that PEI firmware used in later pre-boot, boot, and runtime stages and stored at portions of RAM memory 506 that are defined for and reserved to the PEI module execution. The CPU, at block 530, uses these OEM-defined scalable memory headers to reference those locations within the volatile memory (e.g., main memory) 506 where memory type may be redefined and reallocated for the currently executing boot module firmware and distinguished from those adjusted memory locations reserved and dynamically allotted in parts for use in later pre-boot, boot, and runtime module executions. In an embodiment, the signed memory headers may provide indications to the CPU that certain PEI drivers, modules, or other data associated with the execution of these modules is to remain within a portion of RAM memory 506 while another portion of the PEI reserved memory may be reallocated and reserved space within the RAM device for later phases of pre-boot, boot, or runtime. As a consequence, RAM memory 506 that is no longer reserved for use by the particular pre-boot, boot, and runtime stage may be released for use by other pre-boot, boot, and runtime processes, and other repurposing of reserved portions of RAM memory 506 may be completed. This is done to create an OEM-defined memory layout maintained by the SPI chip such that the memory usage on the RAM device 506 may be dynamically reallocated and increased for any pre-boot, boot, and runtime firmware stage execution, or decreased after any of the pre-boot, boot, and runtime firmware stage execution is completed to free it up for other operations.

Additionally, the establishing of the virtual interface allows for the use of customized or customizable embedded macros. The embedded macros may be used in subsequent boot up process and serve to dynamically allocate portions of reserved memory in pre-boot and boot time with the same memory location and data to be made available for subsequent boot processes. This allows the defined embedded macros to be aligned with memory protection security in pre-boot modules and third-party drivers and applications.

Thus, the use of these embedded macros creates an efficient memory management for boot time and runtime that would otherwise not be available.

Further, the establishing of the virtual interface allows for memory trialing. Again, the execution of the OEM-defined chipset agnostic memory allocation module by the CPU allows the CPU to initiate dynamic memory trialing protocols that search non-volatile memory locations for non-reserved memory locations that can be used to store memory maps and some data for any of the pre-boot, boot, and runtime stages for access later during reboots thereby reducing, potentially, the amount of processing and memory used during these processes for dynamically adjusting reserved portions of RAM with the OEM-defined chipset agnostic memory allocation module due to reference to previously-established dynamically adjustable portions of reserved RAM memory and data for reboot processes. As a result of executing the OEM-defined chipset agnostic memory allocation module with the CPU, the reserved memory space within the RAM for reboot, as well as initial boot up, is dynamically customized in a stored and adjusting OEM-defined memory layout and a memory map may be stored and adjusted at the SPI chip while any pre-boot, boot, and runtime processes are executed at the information handling system during reboot.

As seen in FIG. 5, the establishment of the virtual interface allows for dynamic reallocation at block 535 of reserved memory space within the main memory device 506 (e.g., RAM). In an embodiment, the reallocation of reserved RAM 506 may be accomplished at or after the execution of any pre-boot, boot, and runtime module described herein. At block 535, the method includes reallocating memory space within the reserved RAM via use of the OEM-defined scalable memory headers with the virtual memory interface at the SPI chip. In some embodiments, this includes use of runtime memory extensions. This process, as described herein, is conducted over all available modules through pre-boot, boot and into runtime that are to have reserved memory space for their execution by the CPU. Therefore, blocks 540 through 565 each determine whether the execution of their respective modules during their stages results in use of reallocated space at the virtual interface created via execution of the OEM-defined agnostic memory allocation module and then reallocation of some portion of that modules reserved memory space for a later boot stage. For example, at block 540, the CPU may be used to determine whether the execution of the PEI module during the PEI stage results in some space being available to be reallocated in the virtual interface for later stages of pre-boot, boot or runtime. Where the execution of the PEI module does not result in the reallocation of memory space reserved after the execution of the PEI module, the method continues to block 545.

At block 545, the OEM-defined chipset agnostic memory allocation module may determine if the execution of the DXE core module at the DXE core stage may use reallocated, reserved RAM memory space 506 resulting from completion of the DXE core module execution allowing for reallocated space in RAM 506 made available in the virtual interface. Thus, where the execution of the PEI module does result in the reallocation of memory space reserved for the execution of the PEI module, the method continues to block 570 with the CPU causing the OEM-defined memory map to be updated via the virtual interface created. Otherwise, the previous OEM defined memory map is used for reserved memory space allocated for the DXE module execution. This is done to reflect the allocation or reallocation of the memory space within the reserved RAM memory 506 reserved for, in this example, data associated with the execution of the PEI module to be reallocated for the DXE core module execution. Again, where the execution of the OEM-defined chipset agnostic memory allocation module frees up memory within the RAM device 506 from that reserved for the execution of the PEI module, any changes in the memory map may be documented within the memory map maintained by the SPI chip. By updating the memory map, the memory allocation of RAM for each of the pre-boot, boot, and runtime processes described herein across reboots.

A similar process is conducted for each of the execution of the DXE core module at block 545, the execution of the DXE module at block 550, the execution of the BDS module at block 555, the execution of the ACPI module at block 560, and the execution of the PBA/RT module at block 565. Where no reallocations are detected for each of these determinations at blocks 540 through 565, the method utilizes the current memory map for the virtual interface as redefined or reallocated up to that point and continues to the next pre-boot, boot, and runtime during the boot-up process without a reporting of additional reallocation and updating of the memory map at block 570 for that stage. However, at any pre-boot, boot or runtime stage where it is determined that memory 506 is to be reallocated after completion of the execution of any of these modules, the method 500 includes this reporting at block 570 and updating of the OEM-defined virtual interface memory map to reflect reallocation of the memory space within the volatile memory (e.g., the RAM) 506 for the next or later pre-boot, boot, or runtime firmware module executions with reserved portions of RAM 506. This process may also be cyclical in that the method may update the memory map as reallocations are made and pre-boot-boot, and runtime stages progress. Macros may be used to determine this dynamic adjustments to portions of reserved memory allocated and reallocated and memory trialing may be used to store these adjustable phases of the virtual memory interface and memory maps as well as preserve some data generated in certain pre-boot, boot or runtime module execution phases for later access and reference during reboots.

The method 500 may also include, at block 575, the boot-up finishing and the process entering regular runtime. It is appreciated as well, that the CPU may continue to execute the OEM-defined chipset agnostic memory allocation module that allows runtime reserved allocated memory to be reallocated when hardware drivers are updated and during subsequent boots or reboots of the information handling system. At this point, the method 500 may end.

The blocks and steps of the flow diagrams of FIG. 5 or steps and aspects of the operation of the embodiments herein and discussed above need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An information handling system comprising:
   a hardware processor;
   a memory device operatively coupled to a serial peripheral interface (SPI) chip and the hardware processor;
   a power management unit (PMU) to provide power to the hardware processor and memory device;
   the SPI chip to interface the hardware processor executing plural stages of boot firmware modules during a boot process of the information handling system to allocated, reserved portions of the memory device for each stage of boot module executed in pre-boot, boot, and runtime phases;
   the hardware processor, via the SPI chip, executes an original equipment manufacturer (OEM)-defined agnostic memory allocation firmware module to generate a virtual interface for a customized set of allocated, reserved portions of the memory device for the plural stages of the boot modules; and
   the hardware processor executing the OEM defined agnostic memory allocation firmware to redefine the virtual interface for each allocated reserved portion of the memory device at each of the plural stages of the boot modules that are executed from pre-boot, through boot, and to runtime to adjust reserved portions of the memory for at least one of those boot modules executed by the hardware processor.

2. The information handling system of claim 1 further comprising:
   the hardware processor executing the OEM-defined agnostic memory allocation firmware module to reassign part of a first allocated reserved portion of the memory device to a second allocated reserved portion of the memory device after completion of a pre-boot stage the plural stages of boot module execution.

3. The information handling system of claim 1 further comprising:
   the hardware processor executing the OEM-defined agnostic memory allocation firmware to reassign part of a first allocated, reserved portion of the memory device to a second allocated, reserved portion of the memory device during a runtime stage after boot firmware execution.

4. The information handling system of claim 3 further comprising:
   the hardware processor accessing a runtime services table in an allocated, reserved portion of the memory device created during a driver execution environment stage of the boot module execution via the SPI chip.

5. The information handling system of claim 1 further comprising:
   the hardware processor executing the OEM-defined agnostic memory allocation firmware module to create dynamic and customized macros that define a memory map at the SPI chip after the information handling system has been rebooted.

6. The information handling system of claim 1 further comprising:
   the execution of the OEM-defined agnostic memory allocation firmware includes delivering signed memory headers that securely redefine allocated, reserved portions of the memory for the CPU to access with the virtual interface for each of the plural stages of the boot module execution through pre-boot, boot, and runtime.

7. The information handling system of claim 1 further comprising:
   the hardware processor to execute the OEM-defined agnostic memory allocation firmware during runtime to discover available persistent memory locations with memory trialing for storage of memory map and data for previous allocated, reserved portions of the memory device from prior stages of boot module execution for access from the available persistent memory for use to determine the allocated, reserved portion of the memory with the retrieved memory map associated with the memory device by the SPI chip during reboot.

8. The information handling system of claim 7 further comprising:
   the hardware processor to execute the OEM-defined agnostic memory allocation firmware to update a memory handler based on the detected available persistent memory for storage of the memory map of the allocated, reserved portion of the memory device create a non-volatile random-access memory (NVRAM) variable within a handler database stored on the SPI chip for use with reboot.

9. A method of booting an information handling system, comprising:
   executing, with a central processing unit (CPU), a boot sequence with plural stages of boot modules from a non-volatile memory device;
   executing, with the CPU, an original equipment manufacturer (OEM)-defined agnostic memory allocation module to generate a virtual memory interface at a serial-peripheral interface (SPI) chip to create a customized set of allocated, reserved portions of a memory device for the plural stages of the boot modules; and
   the CPU executing the OEM-defined agnostic memory allocation module to redefine the virtual memory interface at the SPI chip to redefine a portion of at least one allocated, reserved portion of the memory device designated for at least a first boot module of the plural stages of the boot modules that are executed from pre-boot, through boot, and to runtime to a second boot module of the plural stages of the boot modules with scalable memory headers for the CPU to access the redefined portion of at least one allocated, reserved portion of the memory device.

10. The method of claim 9 further comprising:
    executing, via the CPU, the OEM-defined agnostic memory allocation firmware to reassign part of a first allocated, reserved portion of the memory device to a second allocated, reserved portion of the memory device after completion of a first pre-boot stage the plural stages of boot module execution.

11. The method of claim 9 further comprising:
executing, via the CPU, the OEM-defined agnostic memory allocation firmware to reassign part of a first allocated, reserved portion of the memory device to a second allocated, reserved portion of the memory device during a runtime stage after boot firmware execution of the plurality of boot modules.

12. The method of claim 9 further comprising:
accessing an adjustable memory map for redefined allocated, reserved portion of the memory by the CPU via the virtual memory interface at the SPI chip during execution of the plurality of boot modules.

13. The method of claim 9 further comprising:
executing, via the CPU, the OEM-defined agnostic memory allocation firmware to create dynamic and customized macros that define an adjustable memory map for the virtual memory interface at the SPI chip after the information handling system has been rebooted.

14. The method of claim 9 further comprising:
executing, via the CPU, the OEM-defined agnostic memory allocation firmware to deliver the scalable memory headers that securely redefine the virtual memory interface for the redefined allocated, reserved portions of the memory device for at least first boot module of the plural stages of the boot modules for execution through pre-boot, boot, and runtime.

15. The method of claim 9 further comprising:
executing, via the CPU, the OEM-defined agnostic memory allocation firmware to discover available persistent memory locations for storage of an adjustable memory map for the previous allocated, reserved portion of the memory device from previous boot module executions for access and use as the adjustable memory map with the virtual memory interface for allocated reserved portions of the memory at the SPI chip during later reboots.

16. The method of claim 9 further comprising:
executing, with the CPU, the OEM-defined agnostic memory allocation firmware during the plural stages of boot module execution to dynamically adjust plural allocated, reserved portions of the memory designated for plural boot module stages to redefine the allocated, reserved portions of memory to utilize unused parts for additional memory for later plural boot module stages via the virtual memory interface on the SPI chip.

17. An information handling system comprising:
a central processing unit (CPU);
the SPI chip to establish a virtual memory interface for the CPU executing the plural stages of boot modules during a boot process of the information handling system to allocate reserved portions of the memory device for each stage of boot module executed in pre-boot, boot, and runtime phases;
the CPU to execute an original equipment manufacturer (OEM)-defined agnostic memory allocation firmware module generate the virtual memory interface for a customized set of allocated reserved portions of the memory device for the plural stages of the boot modules defined by an OEM via an adjustable memory map;
the CPU executing the OEM defined agnostic memory allocation firmware module to redefine the adjustable memory map for use with the virtual memory interface for a plurality of allocated reserved portions of the memory device assigned to the plural stages of the boot modules that are executed from pre-boot, through boot, and to runtime phases to provide adjustments to allocated, reserved portions of memory for later stages of executed plural stages of the boot modules; and
the CPU executing the OEM-defined agnostic memory allocation firmware module to create dynamic and customized macros that define the adjustable memory map for use after the information handling system has been rebooted.

18. The information handling system of claim 17 further comprising:
the CPU executing the OEM-defined agnostic memory allocation firmware to reassign part of a first allocated, reserved portion of the memory device designated for a first boot module execution to a second allocated, reserved portion of the memory device after completion of the first boot module execution of the plural stages of boot module execution.

19. The information handling system of claim 17 further comprising:
the CPU executing the OEM-defined agnostic memory allocation firmware to reassign part of a first allocated, reserved portion of the memory device designated to a pre-extensible firmware interface (PEI) module execution to a second allocated, reserved portion of the memory device during execution of a later stage boot module execution of the plural stages of boot module execution.

20. The information handling system of claim 17 further comprising:
the CPU executing the OEM-defined agnostic memory allocation firmware to reassign part of a first allocated, reserved portion of the memory device designated to a driver execution environment (DXE) module execution to a second allocated, reserved portion of the memory device during execution of a later stage boot module execution of the plural stages of boot module execution.

* * * * *